Figure 1:
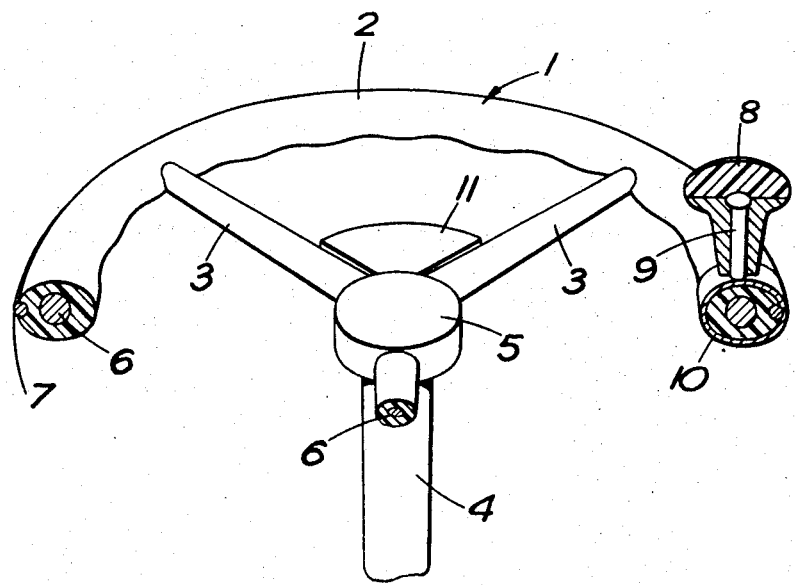

United States Patent
Kulick et al.

[15] 3,703,217
[45] Nov. 21, 1972

[54] VEHICLE WITH MANUALLY OPERATED STEERING SYSTEM

[72] Inventors: Bruno Kulick, Bobenheim/Roxheim; Karlheinz Lamneck, Beindersheim, both of Germany

[73] Assignee: Lansing Bagnall Limited, Basingstoke, England

[22] Filed: Oct. 7, 1970

[21] Appl. No.: 78,649

[52] U.S. Cl. ............... 180/99, 200/52, 200/61.57, 340/279
[51] Int. Cl. ........................................... G08b 21/00
[58] Field of Search ............ 200/52, 61.57; 340/279; 180/99

[56] References Cited

UNITED STATES PATENTS

| | | | |
|---|---|---|---|
| 3,559,206 | 1/1971 | Beecham | 180/99 X |
| 3,194,975 | 7/1965 | Diamond | 200/52 |
| 3,026,503 | 3/1962 | Scheer | 180/99 X |
| 2,385,982 | 10/1945 | Gary | 180/99 |
| 2,128,916 | 9/1938 | Cox | 340/279 |
| 3,177,481 | 4/1965 | Joy et al. | 180/99 X |
| 3,320,438 | 5/1967 | Myers | 200/52 |
| 3,283,166 | 11/1966 | Stift | 180/99 X |
| 3,382,408 | 5/1968 | Atkins | 240/279 X |
| 3,585,626 | 6/1971 | Tartarini | 340/279 |
| 3,594,772 | 7/1971 | Setser | 180/99 |

Primary Examiner—Robert J. Spar
Attorney—Martin Kirkpatrick

[57] ABSTRACT

A vehicle has a manually operated steering system controlled by a steering handle, there being mounted on the steering handle an operating element which, in the event of a sudden disability of the driver, effects operation of a shutting-down system on the vehicle. The operating element comprises an electrical conductor mounted on the steering handle and functioning as a capacitive transmitter which constitutes the active capacitance in a capacitive bridge circuit for detecting a change in the effective capacitance of the capacitive transmitter, according to whether or not a driver's hand is on the steering handle. The bridge circuit operates a relay which switches off the vehicle circuits and also controls an hydraulic ram assembly which acts on a brake when the relay is operated.

7 Claims, 3 Drawing Figures

VEHICLE WITH MANUALLY OPERATED STEERING SYSTEM

The invention relates to a vehicle with a manually operated steering system, for example a motor vehicle, a materials handling vehicle or the like.

It is desirable to provide for vehicles of this kind precautions in the event of any sudden disability, loss of consciousness or death of the vehicle driver, in such a way that the vehicle is immediately stopped. Such eventualities must be taken in account in view of the wide range of stresses to which the human organism is subjected owing to the requirements of modern traffic and of the entire circumstances of life, and it is essential to prevent any major material damage or personal injury resulting from a vehicle which has suddenly become driverless.

The prior art already discloses a so-called dead man's push-button for electric railways, where such a push-button has to be depressed by the driver from time to time and which brings the train to a stop if the button is not operated after a predetermined delay period. Such delay periods, which may be of the order of magnitude of minutes in railway traffic, are unsuitable in traffic with steerable vehicles. In this case it is essential to ensure that the shutting-down system comes into effect very rapidly but without imposing any inconvenience on the vehicle driver due to the need for normally maintaining such shutting-down systems inoperative, that is to say without requiring any activities which are not related to the normal driving of the vehicle.

According to the invention, a vehicle has a manually operated steering system controlled by a steering handle and an operating element which, in the event of a sudden disability of the driver, effects operation of a shutting-down system on the vehicle, said operating element of the shutting-down system being disposed on said steering handle.

The operating element may comprise at least one electrical conductor mounted on the steering handle and functioning as a capacitative transmitter, the effective capacitance of which varies according to whether or not a driver's hand is on the steering handle. The electrical conductor may be embedded in the steering handle. In the case where the steering handle comprises a steering wheel, the conductor may be formed by a metallic core extending around and within the steering wheel.

There may be provided a second electrical conductor, at least a part of which is exposed on the surface of the steering handle, which conductor is disposed as mating electrode to the first electrical conductor so as to form part of said capacitative transmitter. In the case where the steering handle is in the form of a steering wheel the second electrical conductor preferably extends around the steering wheel at a uniform distance from the first said conductor.

Also in the case where a steering wheel is provided, a crank knob may be mounted upon the steering wheel, the crank knob having a metal shaft portion connected to the second electrical conductor. In the case where the crank knob has a shank and a head the shank of the knob preferably incorporates said metal shaft portion.

In any of the above arrangements the capacitative transmitter formed by the conductor or conductors may constitute the active capacitance in a capacitative bridge circuit for detecting a change in the effective capacitance of the capacitative transmitter.

The bridge circuit is preferably followed by a monostable switch circuit, preferably with an amplification effect, for supplying the controlled current for a safety element controlling said shutting-down system.

The operating element provided on the steering handle may control an hydraulic circuit of the vehicle incorporating an hydraulic ram assembly which acts on a brake element when the cylinder of the ram assembly is depressurized and a moveable member of which ram assembly is in adjustable connection with a switching member in the supply circuit of an hydraulic pump in the hydraulic circuit, said switching member being adapted to place the pump in a condition to start when the pressure in the hydraulic cylinder drops.

The switching member may also control a valve which releases the supply of hydraulic fluid delivered by the hydraulic pump into an hydraulic circuit of the vehicle only if the piston of the hydraulic ram assembly is first moved by the hydraulic pressure generated by the pump into a limiting position to release the brake element.

A valve assembly incorporating a non-return valve may be disposed up stream of the hydraulic ram assembly to release return flow from the cylinder of the ram assembly in the event of the shutting-down system becoming operative.

The valve assembly may be constructed as a solenoid valve assembly the winding of which is connected in an electric circuit which may be interrupted by a relay controlled by the operating element on the steering handle. A restrictor valve may be disposed in the supply line to the hydraulic ram assembly.

Figure 2:
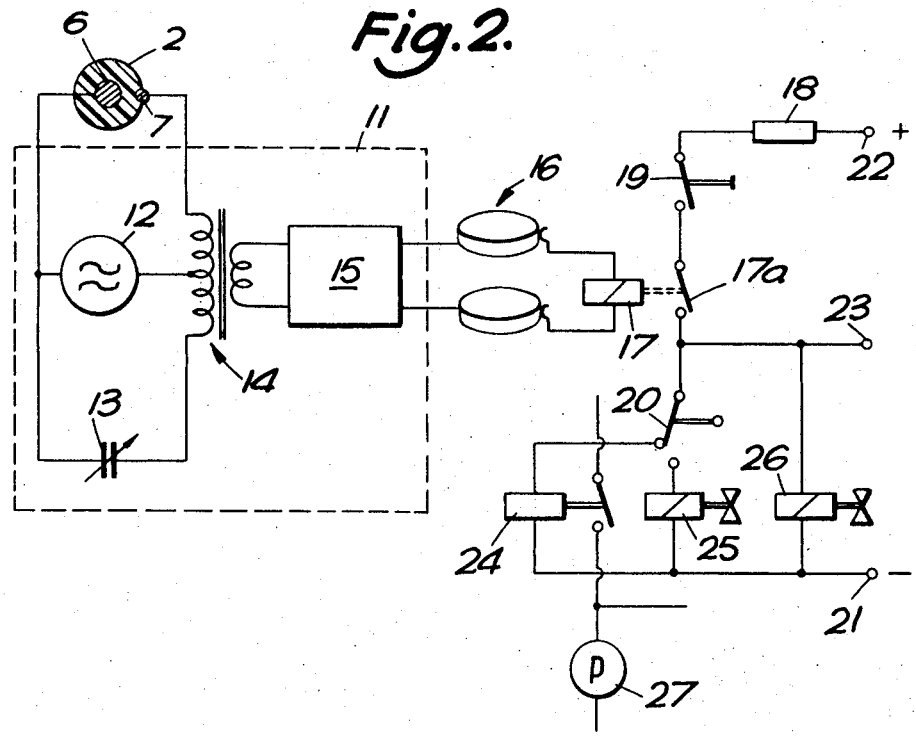
Figure 3:
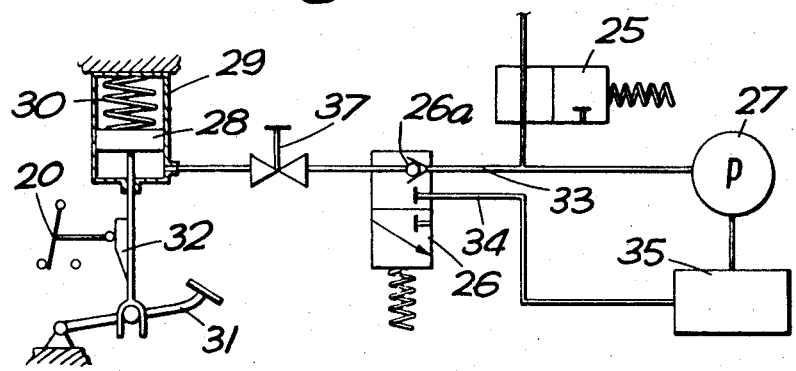

The following is a more detailed description of one embodiment of the invention reference being made to the accompanying drawings in which:

FIG. 1 shows a steering wheel with a capacitative transmitter such as may be used, for example, in a materials handling vehicle constructed according to the invention, FIG. 2 shows a cross-section through the ring of the steering wheel shown in FIG. 1 and also shows the electric circuits of the shutting-down system connected to the capacitative transmitter, and FIG. 3 shows an hydraulic circuit of the shutting-down system controlled by the electric circuit.

The steering wheel illustrated in FIG. 1 is constructed in the usual manner and comprises a ring 2 supported by three spokes 3 on a boss 5 mounted on a longitudinal steering column 4.

The spokes as well as the ring of the steering wheel are provided in their interior with a conventional metallic core 6. An electric conductor 7 is embedded in the external surface of the ring 2 around its periphery and is parallel to the core 6. Part of the surface of the conductor 7 is exposed so that it can come into contact with the hand of the vehicle driver. The two electrodes represented by the core 6 and the conductor 7 constitute the capacitative transmitter.

As can be seen at the right-hand side of FIG. 1, the ring 2 of the steering wheel is provided with a crank knob 8 of the kind conventionally employed in materials handling vehicles but also commonly used in vehicles for the disabled. Embedded in the metal shank portion of this knob is a metal shaft 9 which in turn is mounted on a metal sleeve 10 which encircles the ring 2 and is in contact with the conductor 7. The electric circuit of the shutting-down system, to the extent to which it is connected to the moving part of the steering wheel 1 or to the steering column 4, is mounted in a housing 11 disposed between two spokes 3 of the steering wheel. The circuit is preferably encapsulated in the housing 11 in order to render it insensitive to vibrations.

The essential details of the electric circuit are illustrated in FIG. 2. The capacitance formed by the core 6 and the conductor 7 is connected in a capacitative bridge circuit which is fed by an oscillator 12. The reference capacitance 13 of the bridge circuit is adapted to be variable for matching the circuit and may be constructed in appropriate cases from a plurality of capacitors connected in parallel. Two halves of a winding of a transformer 14 are also connected in the bridge circuit. The output of the transformer 14 is connected to a monostable switch circuit 15, preferably with amplification characteristics. The switch circuit 15 is disposed within the housing 11 and its outputs are brought out by means of coaxial cable to slip-rings 16 on the steering column 4. The oscillator 12 and the switch circuit 15 are also supplied with current via slip-rings.

In order to reduce the risk of defective electrical contact due to vibrations, each slip-ring is preferably provided with three brushes which may be disposed at equal distances from one another around the ring. Only one of each set of brushes is shown diagrammatically in FIG. 2. Conductors extend from the brushes connected to the outputs of the switch circuit 15 to a relay 17 which operates a contact 17a in the main electric circuit of the vehicle.

In this circuit the numeral 18 refers to a fuse, the numeral 19 refers to the conventional key-switch, and the numeral 20 refers to a changeover switch the function of which is explained below. The terminals 21 and 22 are connected to the negative and positive terminals respectively of the vehicle battery. The terminal 23 cooperates with a traction circuit if an electric drive is provided and where appropriate cooperates with a circuit for controlling the hydraulic system of the vehicle.

The numeral 24 refers to a contactor in the supply circuit of the hydraulic pump 27 (FIG. 3) while the numerals 25 and 26 refer to solenoid valves whose function will be described below with reference to FIG. 3.

Referring to FIG. 3, the pump 27, when operated, draws hydraulic fluid from the tank 35. The solenoid valve 25 is adapted, when energized, to connect the pump 27 to the main hydraulic circuit (not shown) of the vehicle and, when deenergized to cut off the supply of hydraulic fluid from this main hydraulic circuit. The main hydraulic circuit of the vehicle may, in the case of a fork lift truck, control the conventional lift and tilt circuits.

When the solenoid valve 26 is energized, as shown in FIG. 3, the hydraulic fluid delivered by the pump 27 passes via a conduit 33, non-return valve 26a, and a regulating valve 37, to the underside of the piston 28 in an hydraulic ram assembly 29. When the solenoid valve 26 is de-energized the underside of the piston 28 is placed into communication with the tank 35 via a conduit 34. A spring 30, disposed within the cylinder of the ram assembly above the piston 28, urges the piston downwardly when the ram assembly is placed into communication with the tank 35, and depresses a brake pedal 31 or some other brake element of the vehicle. A cam 32, having approximately the shape illustrated in FIG. 3, is mounted on the piston rod and is adapted to act on the switch 20 so that said switch starts the pump 27 via the contactor 24 when the piston descends.

When the vehicle is at rest and the driver is not holding the steering wheel, the electric circuit is in the condition shown in FIG. 2 and the hydraulic circuit is in the condition shown in FIG. 3, except that the solenoid valve 25 is in a de-energized condition and will thus shut-off the hydraulic circuit of the vehicle from the pump 27.

When the vehicle driver grips the ring 2 of the steering wheel, a signal is transmitted form the capacitative transmitter to the switch circuit 15 which causes the contact 17a to be closed. If the driver then operates the key switch 19, the circuit will be completed through the switch 20 and contactor 24 and the the pump 27 is therefore energized. The pump 27 delivers hydraulic fluid through the conduit 33, non-return valve 26a, and regulator valve 37 to the underside of the piston 28 in the ram assembly 29. This raises the piston 28, against the action of the spring 30, and releases the brake 31. At the same time the raising of the cam 32 changes over the switch 20. This stops the pump 27 (by means of the contactor 24) and energizes the solenoid valve 25. When the pump 27 stops, the non-return valve 26a maintains the pressure below the piston 28. The energization of the solenoid valve 25 moves it to the position shown in FIG. 3 in which the pump 27 is in communication with the hydraulic circuit of the vehicle. The pump 27 may thus supply hydraulic fluid to that circuit, when required, (in the case of a fork lift truck, for example, to operate the lift or tilt mechanisms) when operated by its own electrical control circuit (not shown). This electrical control circuit also includes the relay contact 17a so that it is impossible to operate any part of the circuit after the contact 17a has been opened.

Should the driver of the truck release his hold on the steering wheel for any reason, for example through sudden loss of consciousness or death, then a signal will be transmitted from the capacitative transmitter to the switch circuit 15 operating the relay 17 so as to open the contact 17a. The relay 17 has an adjustable time delay circuit so that there is a delay between the signal being transmitted and the relay 17 operating. This ensures that the shutting-down system is not triggered when the driver only momentarily removes his hands from the steering knob, for example when cornering.

Opening of the contact 17a de-energizes the solenoid valves 25 and 26. De-energization of the solenoid valve 25 cuts off f the supply of hydraulic fluid from the pump 27 the hydraulic circuit of the vehicle. If the pump 27 happens to be operating at this time it is stopped by the contact 17a interrupting its electrical control circuit as mentioned above. A pressure relief valve (not shown) is provided in the pump circuit to vent to the tank 35 any rise in fluid pressure in the circuit after the valves 25 and 26 are operated.

De-energization of the solenoid valve 26 places the underside of the piston 28 in the ram assembly 29 into communication with the tank 35 and the piston 28 is therefore urged downwardly by the spring 30, depressing the brake pedal 31 and bringing the vehicle to a halt. The downward movement of the piston also changes over the switch 20 so that the pump 27 is ready to be started to raise the piston 28 as soon as the driver's hand is replaced on the steering wheel, as described above.

Should the cylinder 29 lose oil (due to a leak in the system) while the truck is being driven normally, the piston 28 will fall and the cam 32 will operate the switch 20. After this two things occur: the control valve 25 closes the lift and tilt system hydraulic circuits of the truck, and the pump 27 starts to run lifting piston 28 thus releasing the brake 31. This prevents driving with partly operated brakes.

In the case of broken or leaking hydraulic circuits or an interruption in the electrical circuit, which could be caused through a faulty connection pipe, fuse, contact or one of the two solenoid valve coils, the braking system is automatically operated because the contactor 24 in the supply circuit of the pump 27 drops out causing the de-energized solenoid valve 26 to allow the hydraulic fluid previously trapped under the piston 28 to return to the tank 35. This in turn allows the piston which is operated by the spring 30 to actuate the braking system. This means that if a defect occurs the system automatically fails to safe.

Instead of being a capacitative transmitter, the transmitter on the steering handle may be constructed in the form of a pneumatic or hydraulic transmitter. For example the transmitter may comprise a hose disposed around the steering wheel and the flow cross-section of the hose may be variable under the hand pressure of the vehicle driver.

Alternatively the transmitter provided on the steering handle may be a resistive transmitter comprising two conductors which are initially electrically insulated from one another but may be connected with each other by contact with the driver's hand. The conductors then represent a non-inductive resistor which is suitably connected in a bridge circuit.

It is also possible for the transmitter to be constructed in inductive form simply by accommodating a coil in the ring of the steering wheel or other steering handle, said coil being connected as an active inductance in an inductive bridge circuit. The approach of the driver's hand to the active inductance will not substantially de-tune such an inductive bridge circuit, but there are cases, for example where materials handling vehicles are used in refrigeration houses or out of doors in winter, when the vehicle driver regularly wears gloves. Such gloves may be provided in simple manner with a flexible insert of a ferro-magnetic material. The hand spacing, which is unpredictable, would in such a case possibly exclude satisfactory adjustment of the sensitivity if a capacitative transmitter were used.

In the example shown in FIG. 1 the crank knob 8 is so constructed that its shaft 9 terminates at a suitable distance below the top surface of the head of the knob so that signal transmission for triggering the shutting-down system is not prevented by the vehicle driver, having become unconscious, descending from above on to the knob. In the illustrated embodiment, the shutting-down system can be prevented from triggering in normal vehicle operation only by at least gripping around the knob shank in the zone of the shaft 9.

We claim:

1. A vehicle having a manually operated steering system controlled by a steering handle including a steering wheel, and having, mounted on said steering wheel, a capacitative transmitter comprising a first electrical conductor and a second electrical conductor, said first electrical conductor being formed by a metallic core embedded within and extending around said steering wheel, said second conductor being spaced from said first conductor and having at least a part thereof exposed on said steering handle, the effective capacitance of said capacitative transmitter varying according to whether or not a driver's hand is on said steering handle, said capacitative transmitter constituting one arm of a capacitative bridge circuit, and the vehicle also having a monostable switch circuit which follows said bridge circuit and supplies a control current for a safety element controlling a shutting down system for the vehicle.

2. A vehicle according to claim 1, wherein said second electrical conductor extends around said steering wheel at a uniform distance from said first electrical conductor and a crank knob is mounted upon said steering wheel, said crank knob having a metal shaft portion connected to said second electrical conductor.

3. A vehicle according to claim 2, wherein said crank knob has a shank and a head, and said shank of the knob incorporates said metal shaft portion.

4. A vehicle according to claim 3, wherein said capacitative bridge circuit controls an hydraulic circuit of the vehicle incorporating an hydraulic ram assembly which acts on a brake element when a cylinder of said ram assembly is depressurized, a movable member of said ram assembly being in adjustable connection with a switching member in the supply circuit of an hydraulic pump in said hydraulic circuit, said switching member being adapted to place said pump in a condition to start when the pressure in said hydraulic cylinder drops.

5. A vehicle according to claim 4, wherein said switching member also controls a valve which releases a supply of hydraulic fluid delivered by said hydraulic pump into said hydraulic circuit of the vehicle only if the piston of said hydraulic ram assembly is first moved by hydraulic pressure generated by said pump into a limiting position to release said brake element.

6. A vehicle according to claim 5, wherein a valve assembly incorporating a non-return valve is disposed upstream of said hydraulic ram assembly to release return flow from said cylinder of said ram assembly in the event of said shutting-down system becoming operative.

7. A vehicle having a manually operated steering system controlled by a steering wheel, a first electrical conductor and a second electrical conductor extending around said steering wheel, said first conductor being formed by a metallic core embedded in the steering wheel, said conductors being spaced from one another to form a capacitative transmitter the effective capacitance of which varies according to whether or not a driver's hand is on said steering wheel, said capacitative transmitter constituting one arm of a capacitative bridge circuit, and the vehicle also having a monostable switch circuit which follows said bridge circuit and supplies a control current for a safety element controlling a shutting down system for the vehicle.

* * * * *